United States Patent
Dorman

(10) Patent No.: US 10,220,922 B2
(45) Date of Patent: Mar. 5, 2019

(54) SYSTEM FOR CONVERTING A PADDLEBOARD INTO A GIGGING VESSEL

(71) Applicant: John Clark Dorman, Tabor City, NC (US)

(72) Inventor: John Clark Dorman, Tabor City, NC (US)

(*) Notice: Subject to any disclaimer, the term of this patent is extended or adjusted under 35 U.S.C. 154(b) by 0 days.

(21) Appl. No.: 15/690,395

(22) Filed: Aug. 30, 2017

(65) Prior Publication Data

US 2018/0057122 A1 Mar. 1, 2018

Related U.S. Application Data

(60) Provisional application No. 62/382,318, filed on Sep. 1, 2016.

(51) Int. Cl.
| | | |
|---|---|---|
| B63B 35/14 | (2006.01) | |
| B63B 35/79 | (2006.01) | |
| A01K 97/20 | (2006.01) | |
| B60F 3/00 | (2006.01) | |

(52) U.S. Cl.
CPC ............ *B63B 35/795* (2013.01); *A01K 97/20* (2013.01); *B60F 3/0069* (2013.01); *B63B 35/7946* (2013.01); *B63B 35/14* (2013.01)

(58) Field of Classification Search
CPC ....... B63B 35/14; B63B 35/79; B63B 35/792; B63B 35/795; B63B 35/85; B63B 2035/79; B63B 2035/85; B60F 3/0069; A01K 97/20

USPC ............................................... 441/65, 74, 79
See application file for complete search history.

(56) References Cited

U.S. PATENT DOCUMENTS

| | | | | |
|---|---|---|---|---|
| 4,926,774 A | * | 5/1990 | Winner | B63B 35/7913 114/123 |
| 5,085,000 A | * | 2/1992 | Ford | A01K 97/04 43/55 |
| 5,377,607 A | * | 1/1995 | Ross | B63B 35/795 114/162 |
| 5,803,774 A | * | 9/1998 | White | B63H 21/175 114/61.12 |
| 6,260,803 B1 | * | 7/2001 | Hunts | B63B 35/7979 242/389 |
| 9,428,253 B1 | * | 8/2016 | Morgan | B63B 35/7933 |
| 9,738,129 B2 | * | 8/2017 | Dovel | B60F 3/0007 |
| 2011/0114007 A1 | * | 5/2011 | Flemons, III | B63B 3/38 114/347 |
| 2017/0043846 A1 | * | 2/2017 | Elkinton | B63B 35/85 |
| 2017/0313391 A1 | * | 11/2017 | Dion | B63B 35/7916 |

* cited by examiner

*Primary Examiner* — Daniel V Venne
(74) *Attorney, Agent, or Firm* — Carla Gannon Law

(57) ABSTRACT

A system for converting a paddleboard into a gigging vessel includes a standard stand-up paddleboard outfitted with a conversion system. The conversion system includes a pair of opposing pontoons, a pair of opposing guards each adjacent to one pontoon, and retaining arms and retaining straps for securing pontoons and guards to the stand-up paddleboard. The system includes a pair of wheels that can be lowered for transportation across land, and raised for use in aquatic environments; lights; and a storage compartment for items and captured fish. In one embodiment the pontoons and guards can be folded up for transportation.

5 Claims, 5 Drawing Sheets

SYSTEM FOR CONVERTING A PADDLEBOARD INTO A GIGGING VESSEL

CROSS-REFERENCE TO RELATED APPLICATIONS

This application claims the benefit of U.S. Provisional Application 62/382,318, entitled SYSTEM FOR CONVERTING A PADDLEBOARD INTO A GIGGING VESSEL, filed on Sep. 1, 2016, which is hereby incorporated by reference in its entirety.

BACKGROUND OF THE INVENTION

Field

The present invention relates to fishing-related vehicles, and more specifically, to a system for converting a stand up paddleboard into a gigging vessel.

Related Art

Flounder fishing using a spear, also known as "gigging", is a popular pastime in some areas of the world. Flounders are laterally compressed, bottom hugging fish that are typically found in shallow areas at night. Gigging typically involves trolling shallow waters at night with a powerful light to illuminate the bottom where the flounder lay. When a flounder is detected, the fisherman uses a specially designed spear to stab and retrieve the fish. Gigging vessels are typically smaller flat-bottomed boats, such as Jon Boats, that can navigate shallow water, and that lend themselves to the fisherman standing up to peer over the edge of a vessel in order to search the illuminated bottom for flounder.

Stand up paddleboards ("SUPs") are large surfboard shaped floating boards that are typically propelled by a user with a single paddle. Relative to a Jon Boat a SUP is likely to be less expensive, easier to transport, and more maneuverable. However, the minimalist design of a SUP doesn't reasonably lend itself to gigging based on the SUP's instability in water, lack of storage space, and because it doesn't have lights.

As can be seen, there is a need for a system that combines the stability and features of a Jon Boat, but has the maneuverability and ease of transportation of a SUP. It is preferable that this system incorporates a standard SUP, is easy to use and transport, is stable and maneuverable in the water, and can easily be set up and broken down.

SUMMARY OF THE INVENTION

A system for converting a paddleboard into a gigging vessel includes a standard stand-up paddleboard outfitted with a conversion system. The conversion system includes a pair of opposing pontoons, a pair of opposing guards each adjacent to one pontoon, and retaining arms and retaining straps for securing pontoons and guards to the stand-up paddleboard. The system includes a pair of wheels that can be lowered for transportation across land, and raised for use in aquatic environments; lights; and a storage compartment for items and captured fish. In one embodiment the pontoons and guards can be folded up for transportation.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:

10—gigging vessel;
15—SUP;
17—handle;
20—conversion system;
30—pontoon;
32—guard;
33—guard divider;
34—downwardly facing open side;
35—lights;
36—wiring;
39—light switch;
40—front retaining arm;
41—back retaining arm;
42—joint;
44—retaining strap;
45—spool;
60—wheel arm;
62—skeg;
65—wheel;
67—arm release pin;
69—slot;
70—storage;
71—tie down;
72—slotted lid;
73—hinge;
74—sloped divider;
75—waterproof bag;
78—inner compartment; and
79—battery holders.

Broadly, the present invention pertains to a gigging vessel that includes a SUP and a conversion system. The conversion system generally includes a pair of pontoons that are held at a distance from each other using a pair of rigid, optionally hinged, adjustable retaining arms; a guard that is hollow from the bottom; a pair of straps for securing a SUP to the system; a removable storage container including battery storage; lights integrated with pontoons; and two retractable wheels for transporting the system.

Figure 1:
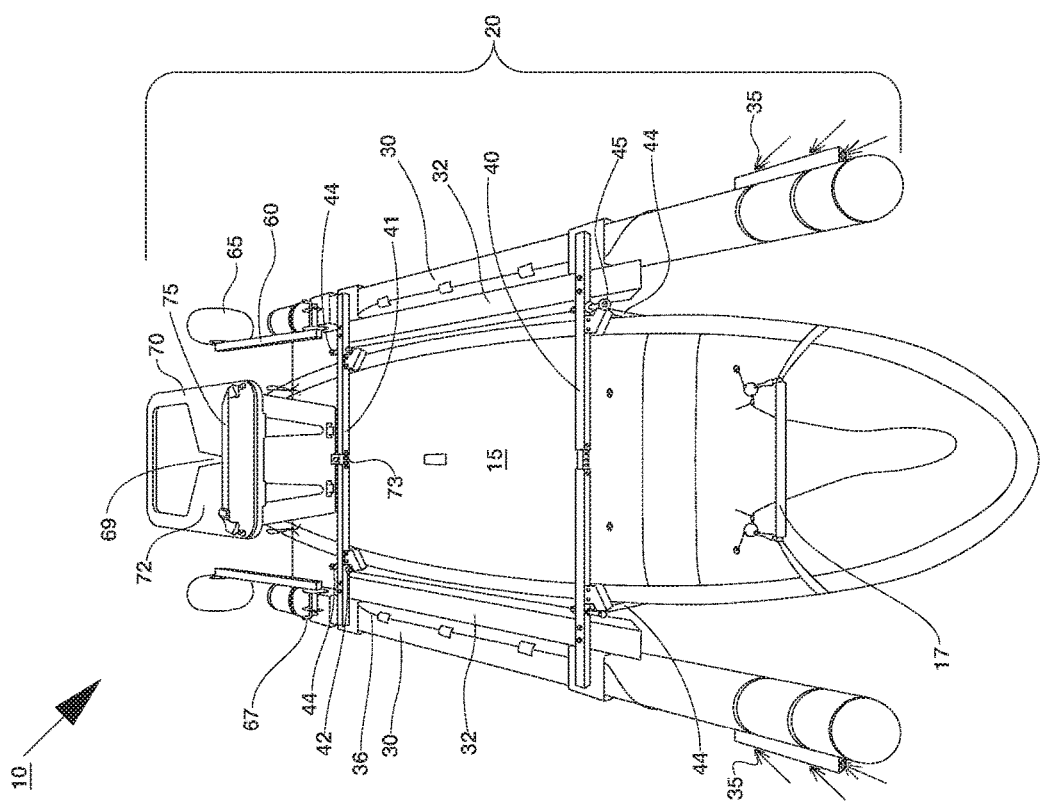
FIG. 1 is a perspective top view of a gigging vessel.

Referring to FIG. 1, gigging vessel 10 generally includes SUP 15, and conversion system 20 that attaches to the SUP. All structures numbered greater than 20 are components of conversion system 20.

Major structures of conversion system 20 include a pair of pontoons 30 and guards 32. Pontoons and guards are stabilized relative to each other and to SUP 15 by front retaining arm 40 and back retaining arm 41, which are constructed of a rigid material such as metal, plastic, carbon fiber, fiberglass or composites. As the names imply, front retaining arm 40 stabilizes pontoons and guards towards the front (nose end) of the SUP, while back retaining arm 41 stabilizes pontoons and guards towards the back (tail end) of the SUP. The length of each retaining arm is adjustable in order to accommodate SUP's of various widths, for example 29" to 35" wide. Adjustability may be provided by telescoping retaining arms, or other means.

Two wheel arms 60, each terminating in a single wheel 65, are each pivotably attached to opposing inner surfaces of pontoons 30. As depicted in FIG. 1, wheels in raised position are out of the way so gigging spear is substantially unencumbered along length of pontoon.

Referring still to FIG. 1, storage 70 is positioned at the rear end of SUP 15, and includes wiring 36 that carries power to lights 35. Storage 70 preferably also serves as a fish box within inner compartment 78. One set of lights 35 is attached to front region of each pontoon 30, with each set of lights preferably including at least two downwardly directed LED's and at least one frontward directed LED. Left and right sets of lights are preferably controlled by corresponding left and right light switches 39, located on storage 70 (FIG. 2).

Figure 2:
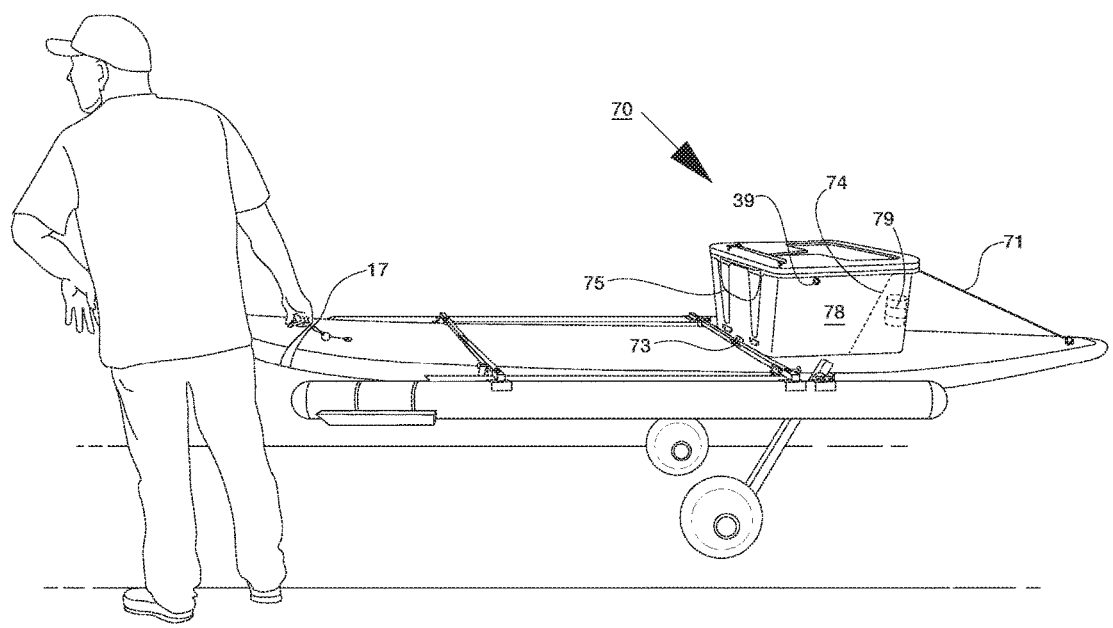
FIG. 2 is a rear perspective side view of a gigging vessel being transported on land.

FIG. 2 shows a side view of gigging vessel 10 with wheels 65 in lowered position. This configuration allows a user to easily transport gigging vessel from one location to another over land by maneuvering handle 17. Wheels 65 are lowered by disengaging arm release pin 67 and lowering wheel arm 60, then reengaging arm release pin 67 to lock the wheel arm in position. Conversely, to prepare vessel for aquatic use, wheels 65 are raised by disengaging arm release pin 67 and raising wheel arm 60, then reengaging arm release pin 67 to lock the wheel arm in raised position.

FIG. 2 also depicts additional structures of storage 70 including internal sloped divider 74 that separates internal compartment 78 into forward side for fish, and rearward side for batteries (not shown) held in position with battery holders 79. Sloped divider 74 provides a "slide" to keep captured fish from jumping out, and to shield batteries from fish. Tie down 71 connects top rear of storage 70 to SUP, preferably at the leash attachment site found on most SUP's. Optional waterproof bag 75 holds personal items such as phone, keys and wallet.

Figure 3:
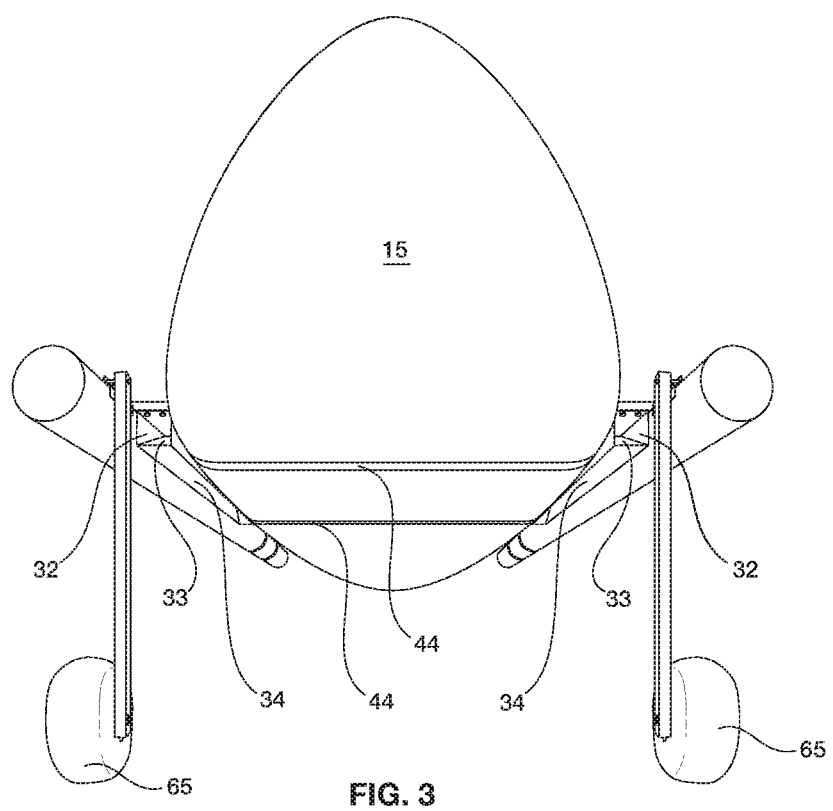
FIG. 3 is a perspective bottom view of a gigging vessel.

FIG. 3 depicts the underside of the vessel with wheels 65 in the lowered position for use on land. Retaining straps 44 provide underside support to conversion system 20 in order to help secure it to SUP 15. As shown in FIG. 1, retaining straps feed into spool 45. Retaining straps are tightened by taking up slack via the spool, and retaining straps are loosened by introducing slack via the spool. In use, retaining straps are preferably taut in order to prevent unnecessary movement of conversion system 20 relative to SUP 15.

Another notable feature of the present invention, shown in FIG. 3, is hollow underside of guard 32 such that each guard has downwardly facing open side 34. Said another way, each guard includes two lateral walls and a connecting top wall, but no bottom wall. Thus, water freely enters guard from bottom side. This unusual configuration creates suction between guard and water beneath, which further stabilizes the vessel. Guard divider 33, located on rear of guard 32, lessens water resistance during forward motion of vessel.

As shown in FIG. 1, wiring 36 protruding from storage 70 enters back retaining arm 41. Wire continues along pontoon 30 to front of vessel to power lights 35. Thus, retaining arm 41 and pontoon 30 serve as electrical wire conduits.

Referring to FIG. 1, storage 70 is preferably secured to rear-most region of SUP by tie down 71. Front of storage 70 is preferably secured to back retaining arm 41 by at least one hinge 73, as shown in FIGS. 1 and 2.

As shown in FIG. 1, top of storage 70 includes slotted lid 72 having slot 69. Slotted lid 72 is specially shaped for introducing a gigged flounder into storage then removing gig and simultaneously retaining flounder in storage. Sloped divider 74 (FIG. 2) shields battery holders and prevents captured flounder from jumping out of compartment. Sloped divider is preferably secured to slotted lid with hinges.

Figure 4:
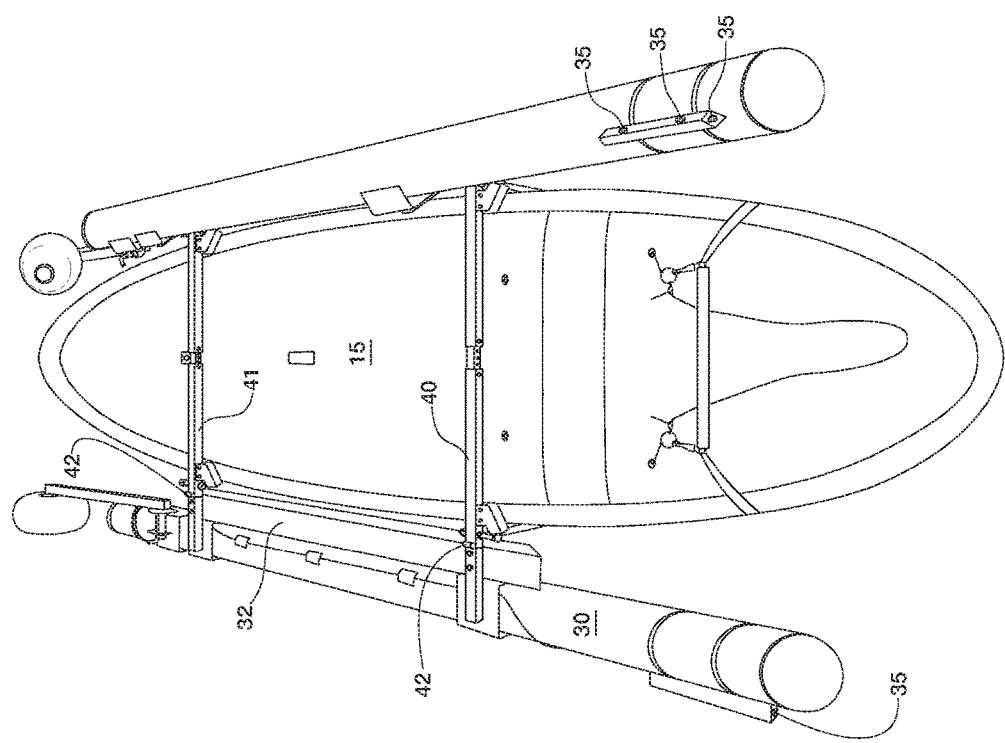
FIG. 4 is a perspective top view of a gigging vessel with the right pontoon partially folded up for transport.

In a preferred embodiment shown in FIG. 4, front retaining arm 40 and back retaining arm 41 each include two distally located joints 42 located between SUP 15 and guard 32. Joints 42 are shown on left side of FIG. 4, but are obscured on right side of FIG. 4. Joints allow guard 32 and pontoon to pivot upwardly and inwardly relative to SUP. The left side shows guard and pontoon in regular extended position for use, while the right side shows guard and pontoon that have been pivoted upwardly and inwardly at joint 42. The configuration depicted on the right creates a narrower profile for the gigging vessel which may be advantageous for transporting the system, for example in the back of a truck. The depiction of one up and one down is for illustration purposes, normally both would be up, or both would be down.

In use, a user positions conversion system 20 such that front retaining arm 40 and back retaining arm 41 are approximately centrally positioned across top of SUP 15, with guards 32 on either side of lateral edges of SUP, and pontoons 31 positioned on either side of outer edges of guards 32. Retaining straps 44 are positioned so to span underside of SUP, with slack drawn up via spools 45. Storage 70 is secured to back retaining arm 41 via hinges 73, and tie down 71. Batteries are inserted into battery holders 79, and wiring 36 is attached to batteries. Wheel arms 60 are lowered by pulling arm release pins 67. The user grasps handle 17, and user rolls gigging vessel 10 to desired location. Upon arriving to desired location, user pulls arm release pins 67, raises wheel arms 60, puts gigging vessel in water, and turns on lights 35 using light switch 39. User maneuvers the gigging vessel using a gig in a poling motion along the bottom for propulsion and turning.

Figure 5:
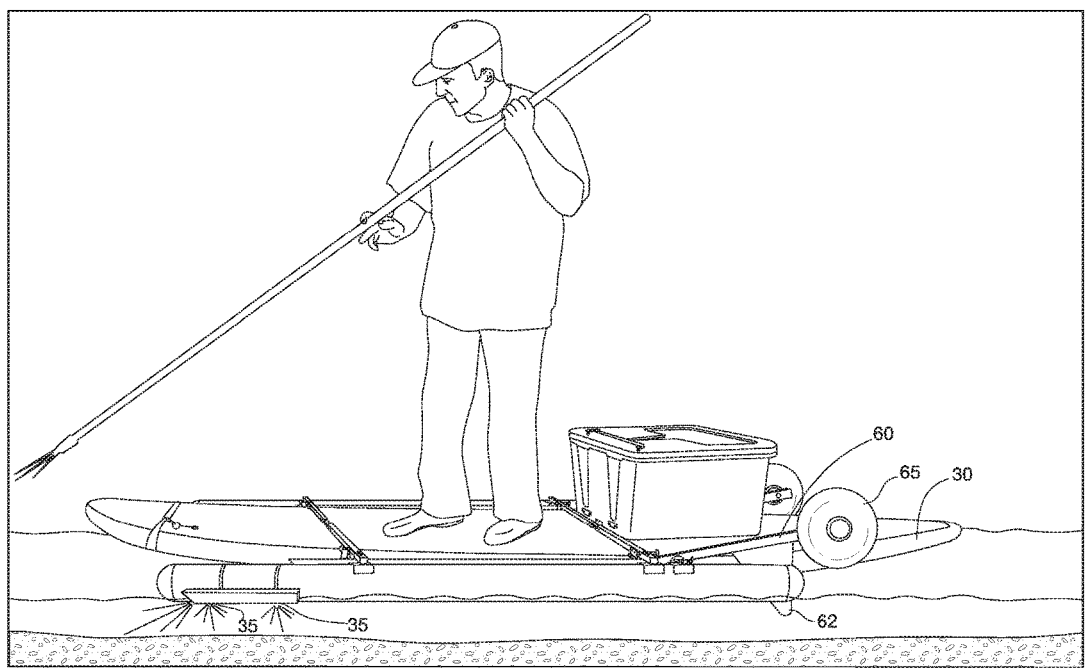
FIG. 5 depicts the invention in use.

Certain modifications are within the scope of this invention. By way of example, it is within the scope of this invention to include skegs 62 on wheel arms 60, as shown in FIG. 5. Also, it is possible to use a pair of pontoons on each side, for a total of four, instead of a total of two pontoons. Also, it is possible to include a towing bar, for example constructed of aluminum tubing that runs from rear retaining arm to the nose of the vessel, so vessel can be towed by a boat.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. It should be understood that all values, unless otherwise stated or contrary to common sense, are +/−10%. It should also be understood that ranges of values set forth inherently include those values, as well as all increments between.

What is claimed is:

1. A system for converting a stand up paddleboard into a gigging vessel including:
   A. A pair of pontoons, each pontoon of the pair of pontoons spaced apart and substantially parallel relative to the other pontoon;

B. A pair of wheels, one of each wheel of the pair of wheels connected to a different pontoon;

C. A pair of guards, one of each guard of the pair of guards adjacent to a different pontoon, each guard of the pair of guards having a downwardly facing open side;

D. A pair of retaining arms spanning said pair of guards;

E. A pair of retaining straps connecting one retaining arm of said pair of retaining arms to the other retaining arm of said pair of retaining arms; and F. A storage box connected to one retaining arm of said pair of retaining arms, said storage box including a slotted lid.

2. The system for converting a stand up paddleboard into a gigging vessel of claim 1 wherein said storage box includes an internal sloped divider.

3. The system for converting a stand up paddleboard into a gigging vessel of claim 1 further comprising a pair of spools, each spool of said pair of spools connecting one retaining strap of said pair of retaining straps to one retaining arm of said pair of retaining arms.

4. The system for converting a stand up paddleboard into a gigging vessel of claim 1 further comprising a pair of wheel arms, each wheel arm of said pair of wheel arms connecting one wheel of said pair of wheels to one pontoon of said pair of pontoons.

5. The system for converting a stand up paddleboard into a gigging vessel of claim 4 wherein each wheel arm of said pair of wheel arms is pivotable relative to a corresponding pontoon of said pair of pontoons.

\* \* \* \* \*